Oct. 21, 1969

H. A. KAURANEN 3,474,226

RANGE OVEN HEATING CONTROL CIRCUIT FOR PYROLYTIC OVEN CLEANING

Filed Aug 10, 1967

INVENTOR.
HERBERT A. KAURANEN
BY
ATTORNEYS

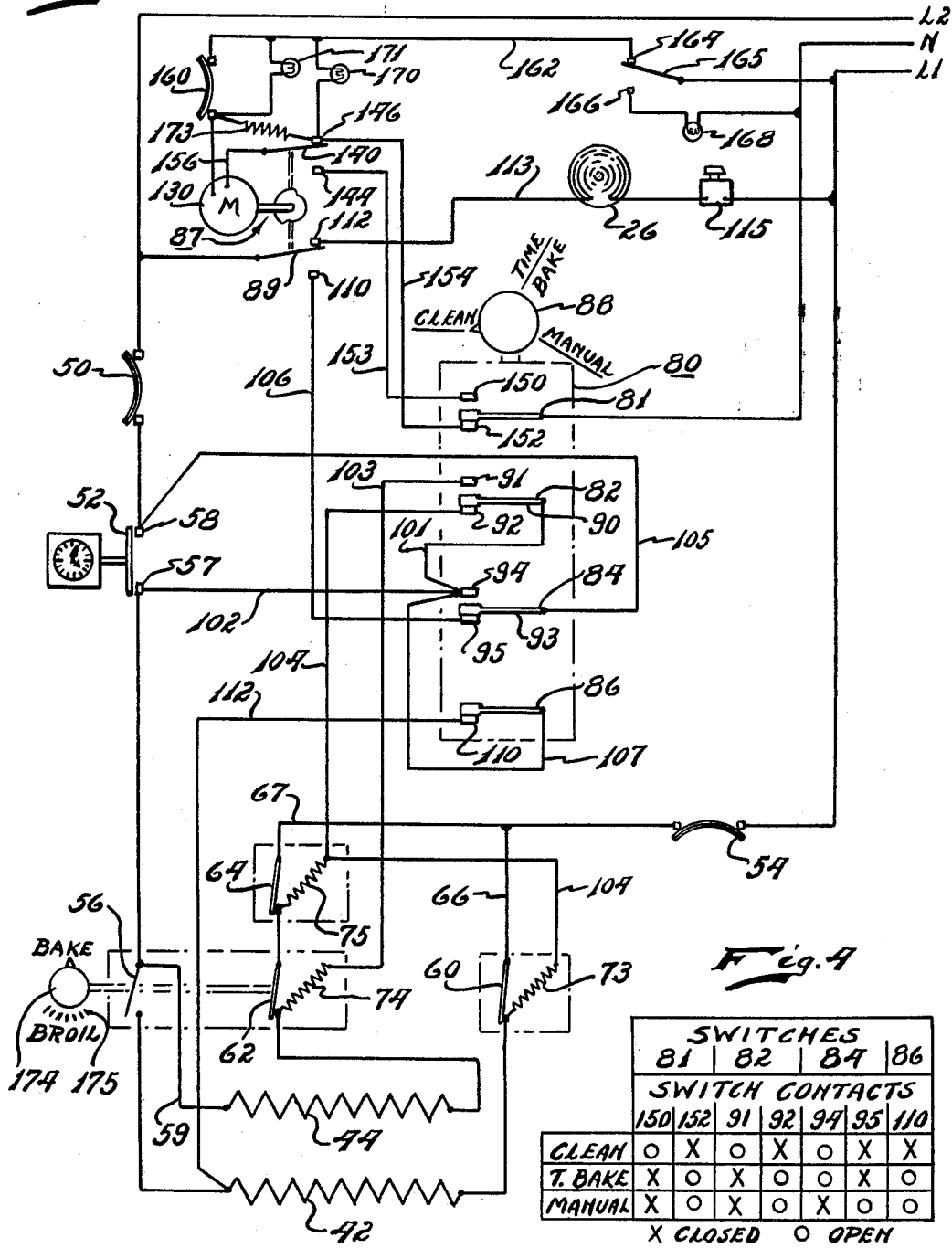

United States Patent Office 3,474,226
Patented Oct. 21, 1969

3,474,226
RANGE OVEN HEATING CONTROL CIRCUIT FOR PYROLYTIC OVEN CLEANING
Herbert A. Kauranen, Inkster, Mich., assignor, by mesne assignments, to Kelvinator, Inc., Cleveland, Ohio, a corporation of Delaware
Filed Aug. 10, 1967, Ser. No. 659,775
Int. Cl. F27d 11/00; A21b 1/00
U.S. Cl. 219—413                   11 Claims

ABSTRACT OF THE DISCLOSURE

An improved control circuit for a range cooking oven heated electrically which includes controlling the temperature rise being elevated to provide a self-cleaning of the oven walls by utilizing the principle of pyrolysis.

---

The present invention pertains to an improved temperature control circuit for range ovens particularly to elevating and controlling high temperatures therein to effect a self-cleaning of the oven walls by using the principle of pyrolysis for removal of food soils lodged thereon during normal cooking use of the oven.

In adapting the principle of pyrolysis to effect a self-cleaning of the walls of a cooking oven from matter that has collected and accumulated during normal bake and cooking use, by the application of high heat in the temperature range of 750°–950° F., it is highly essentialy that the heat input be controlled so that the temperature rise be not too rapid as this may cause damage to the walls and to the porcelain coating generally applied thereon from too rapid expansion. More particularly a too rapid heat input can ignite the matter under certain conditions with the objectionable results that the food and grease matter burns with excessive smoking which the catalyst may be unable to handle with the result that soot and carbon will be carried by the smoke into the kitchen accompanied by objectionable odors.

It is an object of the present invention to control the heat energy into the oven to minimize smoking.

Another object of the present invention is to provide an improved circuit and control arrangement wherein the upper and lower heating elements are for normal selected cooking needs independently selectable and thermostatically controlled, and for the oven cleaning cycle energized in unison in like controlled manner for controlled heat output and temperature rise to a value wherein the heat degrades the food soils lodged on the chamber walls.

Another object of the present invention is a control arrangement for energizing the present upper and lower heating elements in the same cyclic arrangement and at the same voltage to elevate the temperature in the oven cleaning cycle.

Another object of the present invention is an improved interlock control system coordinated with the heat control system under a single control knob which when set to "clean" position, a door latching is first effected and maintained latched until the knob is reset for normal cooking operation whereupon the door is unlatched immediately upon the oven cooling to a temperature of 550° F. or therebelow.

The interlock control system is arranged with a door latching mechanism that is the subject of an application for United States patent filed by William R. Guy entitled "Range Oven Door Latching Device," which is assigned to the same assignee as here and filed on the same day as the present application.

These and other objects and advantages to be gained in the practice of this invention will be better understood and further appreciated upon the reading of the following specifications, having reference to the accompanying drawings.

In the drawings:

FIG. 3 is a wiring diagram incorporating the principles of the present invention; and FIG. 4 is a chart of the positioning of the gang operated switches in the preselector controller when set to the self-cleaning oven cycle, bake cycle and manual which is a non-timed bake use.

Figure 1:
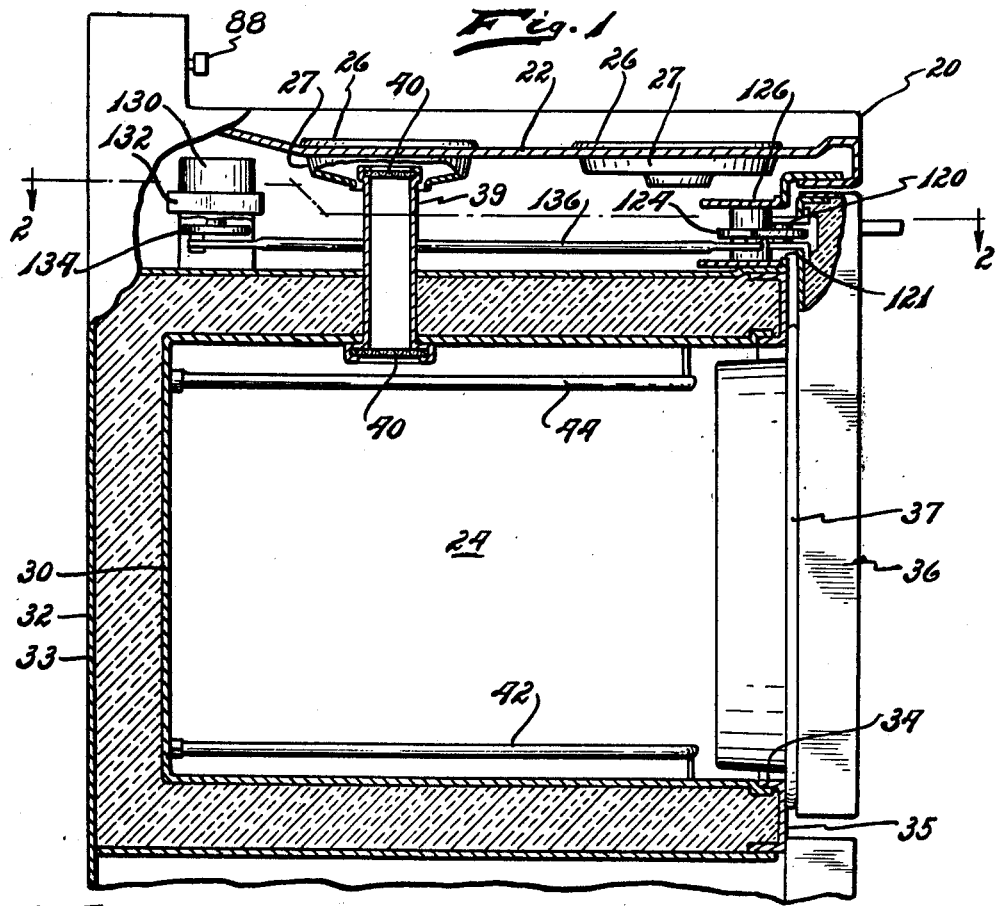
FIG. 1 is a vertical cross sectional view of an electric range embodying the principles of the present invention.
Figure 2:
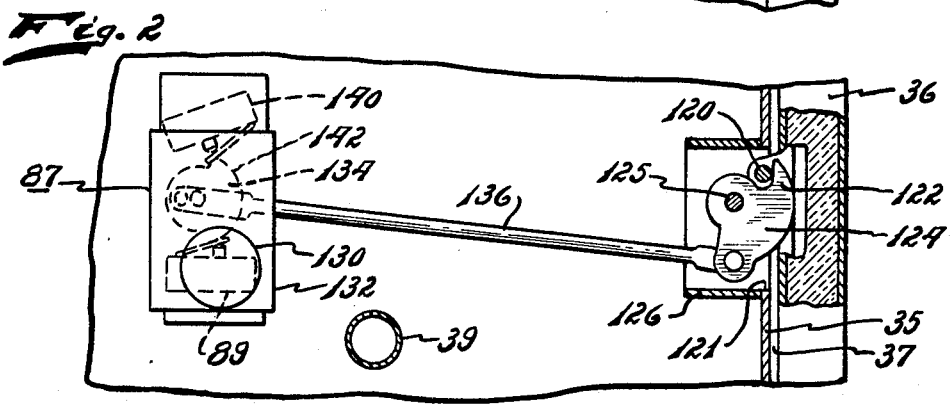
FIG. 2 is a sectional view taken along line 2—2 of FIG. 1.

Referring to the drawings, the number 20 designates in general a cooking range having a cook top 22 and an oven cavity or chamber 24.

The cook top 22 is arranged to support a plurality of surface heating elements 26. Each heating element is supported in an opening formed in the cook top and beneath each element is dependingly supported a respective drip pan 27.

The oven chamber 24 is formed by a box like oven liner 30 supported in spaced apart relation from the sides, top, and bottom of a casing 32 for packing suitable heat insulation 33 therebetween.

Access to the oven chamber is through an opening 34 formed in the front wall 35 and is closed by a drop door 36 that is suitably sealed to the front wall by a gasket 37. The gasket extends perimetrically about the opening 34 except along the bottom edge wherein it is interrupted to form air gaps (not shown) to provide air passages for restricted air movement into the oven chamber.

The oven chamber 24 is suitably vented to the atmosphere in the usual well known manner by an open end conduit 39 leading from the upper rear section of the chamber to terminate in spaced relation beneath a surface heating element. Across each open end of the conduit 39 is positioned a screen 40 that is coated with platinum oxide or the like, to serve as a catalyst.

The oven chamber is provided with two standard heating elements, namely, a lower bake heating element 42 and an upper bake and broil heating element 44.

Referring to FIG. 3 the electric range is provided with a standard electric service of three wire source of power supply nominally of 240 volts, single phase, 60 cycle A.C. comprising line wires L1, L2 and a grounded neutral conductor N.

The oven heating elements 42, 44 are connected in parallel circuits to the power supply lines L1, L2. Each heating element is in series connection with a manually adjustable oven thermostat switch 50, a timer actuated switch 52 and a non-adjustable oven thermostat switch 54. The thermostat switch 50 may be any well known standard type having an off position, a position closeable for broil and a temperature selection control extending from 150° F.–550° F. for normal baking and roasting operation carried out in the oven. The thermostat switch 54 is a non-adjustable type, normally closed, and in the present invention is fixed to open upon the oven attaining a temperature of approximately 850° F.

A bake-broil selector switch 56 is connected in the circuit between the timer switch 52 and the lower heating element 42. Both elements 42, 44 are connected to the contact 57 of the timer switch 52 with the upper heating element 44 being connected in a by-pass circuit around the switch 56 by a conductor 59. The opposite side of the lower heating element 42 is connected to a thermoresponsive cycling switch 60 while the upper heating element 44 is connected to in series connected first and second thermoresponsive switches 62, 64. The circuit from the switches 60, 64 are extended by respective conductors 66, 67 to the non-adjustable thermostatic switch 54 which in turn is connected to the power line L1.

Associated with each cycling switch 60, 62, 64 are heater elements 73, 74, 75 each of which is connected in series to the respective contact of its associated switch. As each heater element and respective switch is in series circuit each heater element, upon being connected to a power source, will be energized and de-energized in accordance to the open or closed position of its respective switch.

Provided is a controller 80 for manual preselection of circuits for the use of the oven to provide normal cooking operations for bake, roast, broil and for the self cleaning operation of the oven by high heat. The controller comprises a gang of switches which includes a plurality of double throw switches 81, 82, 84 and a single throw switch 86 all being selectively operable upon the rotation of a knob 88 by suitable mechanism (not shown). The knob is adjustable to positions of clean, time bake and manual, which positions will be more fully explained hereinafter.

In the controller the switch 82 places the thermoresponsive cycling switch 62 alternately in circuit with the thermoresponsive cycling switches 60, 64. The switches 84, 86 control by-pass circuits around the thermostat switch 50 and the bake-broil selector switch 56. The switch 81 initiates the door latching mechanism 87 to lock and unlock the door and includes an interlock control switch 89 for the high heat cleaning cycle. The door latching mechanism 87 here shown and to be described is the subject of the mentioned application filed by William R. Guy. If desired an equivalent type structure may be used.

The switch 82 has a switch blade 90 alternately movable upon contacts 91, 92 and switch 84 has a switch blade 93 alternately movable upon contacts 94, 95. The blade 90 is connected by conductor 101 to the contact 94 and continued by conductor 102 to connect to the contact 57 of the timer switch 52. The contact 94 is also connected by a conductor 107 to the switch blade of the switch 86 whose contact 110 is connected by a conductor 112 to the lower heating element 42 in a by-pass circuit around the bake-broil selector switch 56.

In the switch 82 the contact 91 is connected by a conductor 103 to the heater element 74 while the heater elements 73, 75 are connected in parallel by conductor 104 to the contact 92.

In the switch 84 the blade 93 is connected by a conductor 105 to a contact 58 of the timer switch 52 and the contact 95 is connected by a conductor 106 to a contact 110 of the double throw switch 89 whose switch blade is connected to power line L2. The other contact 112 of the switch 89 is connected by a conductor 113 to the surface unit 26 positioned over the outlet of the oven vent tube 39. The surface unit 26 is connected in series through a heat selector switch control 115 to power line L1.

The cycling switch 62 and the bake-broil selector switch 56 are preferably interconnected mechanically for control by a knob 174. The cycling switch 62 functions in like manner to the switches 60, 64 but differ in construction in that the switch 62 can be varied, or adjustably tensioned, by rotation of knob 174 through mechanism (not shown) to vary the thermal response to its heater element. This is preferred for preselecting and in controlling the heat output of the upper heating element 44 for broiling. In preselecting broil the switch 56 is automatically opened. This switch arrangement is well known and is commercially available.

Employing the oven for normal use to bake, roast or the like, the controller 80 is positioned on either a time-bake or manual setting. The manual setting is used for broil and for bake if the timer is not desired to control the cooking operation.

In setting the knob 88 of the controller to Time-Bake the user must in sequence adjust the thermostat to a selected temperature, with a cold oven this closes the switch 50, set the timer for the period of operation and finally position the bake-broil selector switch knob 125 to bake which closes the switch 56.

The cycling switches 60, 62, 64 are normally closed. The time-bake circuit follows from L2, closed thermostat switch 50, timer switch 52, through the parallel connected upper and lower heating elements 42, 44, the lower being through closed switches 56, 60, and the upper through closed switches 62, 64 and continuing through closed thermostat switch 54 to L1. Both heating elements 42, 44 are simultaneously controlled by the thermostat switch 50 to maintain the preselected oven temperature. The upper heating element is further cycled by the cycling switch 62 whose heater element 74 is energized in a circuit following from contact 57, conductors 102, 101, switch 82 on contact 91, conductor 103 to the heater element 74. The arrangement is preferably such that the heater element 74 will open and close the switch 62 so that the upper heating element 44 is energized approximately 8 percent of the time in relation to the energization period of the lower heating element. This provides a more uniform distribution of heat within the oven. It will be obvious that the ratio of the heating periods may vary from here stated.

Setting the knob 88 on Manual the circuit varies from that described for the time-bake only in the timer switch 52 is by-passed. The by-pass circuit following from timer contact 58, conductor 105, switch 84 on contact 94, conductor 102 to contact 57. The heating elements are still connected in parallel and the upper heating element 44 is again cycled at the same ratio as time-bake. The circuit to the heater element 74 continued from the contact 94 through switch 82 on the contact 91 as described in time-bake.

With the controller knob 88 set to Manual for use of the oven to broil foods, the user adjusts the thermostat to a broil setting which shuts close the switch 50 so as to be non-responsive to the tempertaure within the oven, opens the timer switch and sets the knob 174 for a preselected temperature setting 175 which adjusts the thermal response of the switch 62 and holds open the switch 56. The upper heating element 44 is alone energized under control of the thermoresponsive cycling switch 62. The circuit for broil is the same as described for manual bake, except heating element 42 is not energized and the switch 72 can be varied in its cycling to vary the heat output of the element 44 by varying the energization periods from 30 to 100 percent.

During normal cooking use of the oven, spatter from foods adhere to the walls of the oven and after repeated continued use the accumulated food particles become hardened and so baked with such adherence to the walls that it becomes difficult to remove by ordinary means as well as an undesirable chore for the housewife. By the application of heat elevated to a temperature range of approximately 750° F. to 950° F. the adhering food soils can be degraded by pyrolytic process to transform the soil matter to gases and free ash which can be readily wiped away. The application of heat however must be controlled and elevated so that the matter will not ignite into flame, or cause such burning that it creates objectionably heavy odorous smoke that will pass out through the vent 39 into the kitchen. By controlling the heat input so that the temperature rise is gradual the soil matter will be fully transformed to vapor and ash with a minimum of smoke and odor and the catalyst on the screens 40 is adequate and efficient in reducing the carbon contents from the smoke and vapors to a non-objectionable value before passing to the atmosphere.

Prior to elevating the temperature to effect self-cleaning of the oven, safety, and safety standards by Underwriters Laboratory, require that the door be latched and locked against opening during the elevated heating period until the temperature has lowered to 550° F. or therebelow. For normal bake use of the oven, with temperatures between 150° F. to 500° F., the door need not be latched. Arranged with the door latching device 87 and operative thereby is the switch 89 which closes the circuit for the high heat operation preset by the controller 80.

The latching device 87 comprises a keeper 120 affixed to the door and is adapted to enter opening 121 formed in the front wall 35 of the range to be engaged by a finger 122 of a latch member 124 that is pivotally journaled by a pin 125 in a bracket 126. The latch member 124 is automatically pivoted into latching and unlatching engagement with the keeper by a motor driven drive comprising an electric motor 130 coupled to drive through a reduction drive assembly 132, a disc 134 to which is pinned one end of a rod 136, the opposite end being pinned to the latch member 124. The drive is such that upon each half revolution of the disc 134 it will pivot the latch member to alternately engage and disengage the keeper. To limit the motor's operation to turning the disc 134 a half revolution a double throw switch 140 is connected in series with the motor and is cam actuated thereby upon completing a latching or unlatching operation. The switch 140 engages a cam face 142 formed on the circumference of the disc 134. The switch 89 is also arranged to follow the cam face to be actuated thereby.

The switch 140 alternately engages contacts 144, 146 that are connected to contacts 150, 152 of the switch 81 in the controller by conductors 153, 154 respectively to form parallel circuits. The switch blade of the switch 81 is connected to the power supply line N while that of the switch 140 is connected by conductor 156 to the electric motor 130. The motor 130 is connected in series to a non-adjustable normally closed thermostat switch 160 which in turn is connected by a conductor 162 to contact 164 of a double throw type door switch 165 whose switch blade is connected to power line L1. The door switch 165 is upon the contact 164 when the door is closed and moves upon an alternate contact 166 when opened to illuminate an oven light bulb 168.

Signal lights 170, 171 are provided. The light 170 indicates that the controller is set to the oven cleaning position. The signal light 170 is connected across from contact 146 to conductor 162 and the circuit is completed through switch 81 on contact 152 which initiates the cleaning cyle. The light 171 indiates that the door is latched and is connected in a by-pass circuit around the thermostat switch 160 and is further connected to a shunt circuit by a resistor 173 from the contact 158 to the conductor 162.

The switch 89 is actuated by the cam 142 following each latching and unlatching operation to open and close the cleaning cycle circuit and in alternate relation closes and opens the circuit to the surface unit 26 that is positioned over the vent outlet 39. It is highly desirable that this unit through which the oven is vented be not usable during the application of high heat into the oven and for this period the circuit to the unit is held open.

To initiate the oven cleaning cycle the user sets the knob 88 to "clean" and next adjusts the timer for starting and stopping the cycle for a timed heating interval determined by the condition of the oven. A minimum period of one hour is generally recommended for an average soiled oven.

Though the switches in the controller are set for the clean cycle the circuits to the heating elements are held open by the switch 89 until the door has been securely latched. The actuation of the switch 81 upon the contact 152 closes the circuit preset by the switch 140 on contact 146 to energise the motor 130 through the closed thermostat switch 160 and the door switch 165 closed upon the contact 164 by the closing of the door 36. The energized motor will operate the door latching mechanism to lock the door and upon completion it de-energizes itself by actuating the switch 140 across the contact 144 to preset the parallel unlatching circuit with the switch 81. Also actuated by the motor 130 is the switch 89 to disable the operation of the surface unit 26 by moving across to engage the contact 110 which closes the circuits preset by the controller 80 to the heating elements 42, 44.

For the duration of the clean cycle the thermostat 50 is by-passed and the heating elements 42, 44 are under control of the non-adjustable thermostat 54 which in response to the temperature within the oven opens when it attains approximately 850° F. The switch 56 is also by-passed and as the heater element 74 is not energized the switch 62 will remain closed.

With reference to the chart of FIG. 4 showing the positioning of the switches in the controller 80 the circuit for the clean cycle follows from L2, switch 89 upon contact 110, conductor 106, switch 84 upon contact 95, conductor 105, closed timer switch 52 to contact 57 from which the heating elements are connected in parallel circuits to the thermostat switch 54 to L1. A first circuit follows from the contact 57, conductor 59, upper heating element 44, nonoperating closed cycling switch 62 and operating thermo-responsive cycling switch 64 to the thermostat switch 54. The second circuit from contact 57 follows conductors 102, 107, switch 86 on contact 110, conductor 112, lower heating element 42, and thermo-responsive switch 60 to the thermostat switch 54. A third circuit to energize the heater elements 73, 75 for the switches 60, 64 follows from contact 57, conductors 102, 101, switch 82 on contact 92, conductor 104 connecting in parallel the heater elements 73, 75. Each heater element 73, 75 is connected in series with a respective switch 60, 64 which it influences.

Each heater element 73, 75 is similar in design to provide a like influence on its respective switch to provide the same heat output for each heating element 42, 44, by opening and closing of their circuits so that their period of energization is approximately 40 to 45 percent "on" and 55 to 60 percent "off." This ratio provides a controlled heat input at a rate to control the temperature rise so as not to cause undue expansion of the walls and damage thereto. Further the rate of heat input is sufficient to degrade the food soils from the walls of the oven by pyrolysis with a minimum of smoking or emission of obnoxious odors and at the same time it minimizes combustion of the gases of bursting into flame which may occur if the heat input is too rapid.

As the food and grease matters adhering to the walls are degraded it produces corresponding gaseous degradation products that are exhausted through the vent tube 39 to the atmosphere. The catalyst coating on the screens 40 will subject the gaseous products passing thereacross to catalytic oxidation which eliminates a substantial portion of any soot forming free carbon and possible carbon monoxide. To increase the efficiency of the catalyst, which functions best at high temperatures, the vent tube 39 is preferably positioned over the heating element 44 to receive direct heat radiation therefrom.

The timer switch 52 will open at the conclusion of the time period to open the circuits and de-energize the heating elements 42, 44 and the heater elements 73, 75 of the switches 60, 64. Until the oven chamber cools down to and below 575° F. the door will remain latched and when it has cooled down the thermostat switch 160 recloses to preset with the switch 140, now on the contact 144, a circuit to the motor 130. As soon as the housewife resets the controller knob 88 away from Clean to either of the two other positions the motor circuit is immediately closed by switch 81 engaging contact 150. The energized motor 130 operates to unlatch the door and thereafter de-energize itself by actuating the switch 140 across to the contact 146. While the controller is adjusted to normal cooking use the door latching arrangement is held inoperative even though there is preset a circuit to relatch the door which circuit cannot be closed until the next setting of the controller to Clean.

In unlatching the door the motor also resets the switch 89 across to contact 112 reconnecting the surface element 26 in operative circuit with the power supply lines through the normal control 115.

Though a timer is shown and described to control the time period for the oven cleaning cycle it will be apparent that the timer switch 52 may be shut closed and the cycle may be manually determined by the user through the setting of the knob 88.

From the foregoing it will be understood that there is coordinated under control of a single knob the selection of the oven heating control circuits and the safety interlock system including the automatic latching and unlatching of the door for the oven cleaning cycle. Further, in energizing both upper and lower heating elements at like voltage and in the same cyclic manner, for the oven cleaning cycle, a uniform heating of all wall areas of the oven chamber is had so that all wall areas are efficiently cleaned with a minimum of smoke and odor.

Although a specific embodiment of this invention has been shown and disclosed, it will be appreciated that certain modifications and improvements are within the spirit and scope thereof. Accordingly, such modifications and improvements as are not specifically excluded by the language of the hereinafter appended claims are to be considered as inclusive thereunder.

I claim:
1. A self-cleaning oven comprising walls defining a chamber, said chamber having an access opening closed by a door, latch means selectively operable to lock and unlock said door, circuit means connected to a power source, heating means for said chamber to provide heat energy to carry out various cooking operations within said chamber or to effect a self cleaning of the walls of said chamber, adjustable thermostat controlled switch means for said heating means variable to hold selected cooking temperatures within a cooking temperature range of 150° F. to 550° F. within said chamber, control means for said heating means being user settable to a cook position to enable said heating means to be controlled in the usual manner to effect any selected cooking operation and being further settable to a "clean" position to control said heating means to effect said oven cleaning operation, an improved control system including said control means for carrying out the steps to effect the self cleaning of the walls of said chamber by elevating the temperature therein above the cooking temperature range to effect a degrading of food and grease deposits therefrom comprising;

electromotive means operatively connected to actuate said latch means to effect a locking and unlocking with said door;

first and second switch means associated with and actuated by said electromotive means upon effecting the completion of each locking and unlocking operation;

said first switch means, said electromotive means and said control means upon being user set to "clean" position connecting said electromotive means in circuit to said power source and being disconnected therefrom upon actuation of said first switch means;

non-adjustable temperature controlled switch means in series circuit with said heating means and power source;

said second switch means being actuated to closed position following completion of said locking operation and connecting in circuit to a power source said heating means under control of said non-adjustable thermostat controlled switch means to supply heat energy into said chamber to a maximum temperature to about 850° F. and said adjustable thermostat controlled switch means being shunted and immobilized by said second switch means, thermo-responsive switch means including heater means to influence said thermo-responsive switch means connected in circuit for controlling said heating means to supply heat energy in cyclic intervals, and said heater means being connected in circuit in series with said switch means by said control means upon being set to "clean" position.

2. A self cleaning oven of claim 1 including
said heating means including a bake heating element and a broil heating element in spaced apart relation within said oven, and means for connecting one of said heating elements in circuit with said thermo-responsive switch means for cyclic energization by said control means upon being set to "cook" position.

3. A self cleaning oven of claim 1 including
said first switch means being a double throw switch having a first position connecting in a first circuit said electromotive means with said control means upon being set to "clean" position to effect the locking of said door and a second position connecting a second circuit with said control means upon being set to "cook" position to effect the unlocking of said door.

4. A self cleaning oven of claim 1 including,
a second non-adjustable thermostat control means responsive to the temperature in said chamber and connected to immobilize said electromotive means in unlocking said door until said chamber has cooled to a value of 575° F. or below.

5. In a cook oven having a door, latch means for said door, a pair of heating elements in said oven being connected in parallel circuits to an electrical power source to supply heat energy selectively for a cooking operation and for a cleaning operation to degrade the food and grease deposits from the walls of said cooking oven, the control circuit, comprising;

thermostat control means responsive to the temperature in said cook oven and being connected in series circuit with said parallel connected heating elements to a power source, said thermostat control means comprising a first thermostatically operated switch means being adjustable to temperature settings to hold preselected cooking temperatures within a cooking temperature range generally between 150° F. to 550° F. and a second thermostatically operated switch means being non-adjustable and normally closed to open upon the temperature in said oven reaching in general 850° F.;

thermo-responsive switch means in series circuit with said heating elements and having heater elements to influence the opening and closing of said thermo-responsive switch means;

electromotive means being operatively connected to operate said latch means to lock and unlock said door;

switch means operable by said electromotive means to closed position following the locking of said door and to open position following the unlocking of said door;

control means user settable to "clean" position closing a circuit operative of said electromotive means and subsequently effecting a closing of said switch means as a consequence thereof, and said switch means with said control means settable to "clean" position closing a circuit operative of said thermo-responsive switch means for energizing at controlled intervals said heating elements in unison under control of second non-adjustable thermostatically operated switch means and shunting from control said first thermostatically operated switch means.

6. The control circuit of claim 5 including,
said thermo-responsive switch means with said control means user settable on "cook" position being limited to cyclically control only one of said heating elements.

7. The control circuit of claim 6 including,
a second thermostat switch means in series circuit with said electromotive means and making inoperative said electromotive means in response to the temperature in said oven being elevated above 575° F.

8. In a cook oven having a door, a motor and latch means operable thereby to alternately lock and unlock with said door, heating means for said oven comprising a bake heating element and a broil heating element, control means having a single knob control being user settable to a "cook" position to enable normal control means to selectively control said heating elements to carry out various cooking operations and being user settable to a "clean" position for said heating elements to elevate the temperature range above the cooking temperature range by presetting circuits with a power source comprising;

a first circuit including a closed switch means to energize said motor to effect a locking or unlocking of said door and thereafter said motor effecting an opening of said circuit by actuating said switch means to open position, a second circuit including a second switch means closed by said motor upon effecting a locking of said door and connecting said bake heating element and said broil heating element in parallel circuit to said power source, a third circuit including thermally responsive control means controlling said second circuit to cyclically energize said bake heating element and said broil heating element in unison and at the same voltage, and said second circuit further including a temperature responsive control means to control the energization of said heating elements in unison to maintain said oven at a temperature range of approximately 850° F.

9. The control circuit of claim 8 wherein
said first circuit further includes a thermostatically controlled switch means closed upon the temperature in said oven being below 550° F. and open when elevated thereabove.

10. The control circuit of claim 9 wherein
said first circuit further includes a switch actuated by said door to closed position upon closure of said door and to open position upon opening of said door.

11. The control circuit of claim 8 wherein
said second and third circuits include a timer controlled switch means to open said circuits.

References Cited
UNITED STATES PATENTS

| | | | |
|---|---|---|---|
| 3,350,542 | 10/1967 | Getman | 219—413 |
| 3,533,004 | 11/1967 | Alexander | 219—413 |
| 3,214,567 | 10/1965 | Chisholm | 219—413 |

BERNARD A. GILHEANY, Primary Examiner

F. E. BELL, Assistant Examiner